US006960851B2

(12) United States Patent
Poulin et al.

(10) Patent No.: US 6,960,851 B2
(45) Date of Patent: Nov. 1, 2005

(54) COOLING DEVICE INCLUDING A BIASING ELEMENT

(75) Inventors: Stéphane Poulin, Ste-Julie (CA);
Martin Houle, Laval (CA);
Louis-Philippe Bibeau, Chambly (CA);
François Messier, Longueuil (CA)

(73) Assignee: TM4 Inc., Boucherville (CA)

( * ) Notice: Subject to any disclaimer, the term of this patent is extended or adjusted under 35 U.S.C. 154(b) by 0 days.

(21) Appl. No.: 10/726,397

(22) Filed: Dec. 2, 2003

(65) Prior Publication Data

US 2005/0116553 A1 Jun. 2, 2005

(51) Int. Cl.⁷ .............................................. H02K 9/00
(52) U.S. Cl. ........................... 310/52; 310/54; 310/57; 310/64
(58) Field of Search ............................. 310/52–64, 254, 310/258, 259, 65

(56) References Cited

U.S. PATENT DOCUMENTS

| | | | | | |
|---|---|---|---|---|---|
| 3,250,929 A | * | 5/1966 | Maier | ........................ | 310/68 R |
| 4,574,210 A | * | 3/1986 | Wieland | ...................... | 310/59 |
| 4,814,651 A | * | 3/1989 | Elris et al. | ..................... | 310/88 |
| 5,438,228 A | * | 8/1995 | Couture et al. | ............ | 310/67 R |
| 5,442,250 A | * | 8/1995 | Stridsberg | .................... | 310/186 |
| 5,810,568 A | * | 9/1998 | Whitefield et al. | ...... | 417/423.8 |
| 6,005,312 A | * | 12/1999 | Yamane | ..................... | 310/67 R |
| 6,114,784 A | * | 9/2000 | Nakano | ....................... | 310/59 |
| 6,601,547 B2 | | 8/2003 | Al-Hawaj | .................. | 123/56.1 |
| 6,633,097 B2 | | 10/2003 | Dunlap et al. | ................ | 310/54 |
| 6,703,738 B2 | * | 3/2004 | Yoshikawa et al. | ........... | 310/91 |
| 2004/0164625 A1 | | 8/2004 | Grundle et al. | | |

OTHER PUBLICATIONS

Internatioanl Search Report for PCT/CA2004/002026, dated Mar. 10, 2005 (3 pgs.).

* cited by examiner

Primary Examiner—Dang Le
(74) Attorney, Agent, or Firm—Lorusso & Loud (57) ABSTRACT

A cooling device for an internal stator of an electric machine. The stator includes a substantially cylindrical cavity having a substantially cylindrical internal surface. The cooling device includes a body defining an external substantially cylindrical contact surface. The cooling device further includes a biasing element connected to the body. The biasing element is so configured and sized as to bias the contact surface of the body against the internal surface of the rotor when the cooling device is positioned inside the cavity.

28 Claims, 12 Drawing Sheets

COOLING DEVICE INCLUDING A BIASING ELEMENT

FIELD OF THE INVENTION

The present invention relates to cooling devices. More specifically, the present invention is concerned with a cooling device including a biasing element to removably secure the cooling device inside a stator of an electric machine.

BACKGROUND OF THE INVENTION

Many electric machines, such as electric motors and generators, among others, generate internal heat while operating. In many cases, this heat has to be continuously removed from the electric machine to prevent an undue increase in temperature that can make the device perform unsatisfactorily or even lead to device failure.

In these cases, a cooling device is connected to the electric machine to draw away excess heat. The cooling device typically includes means for dissipating the heat, such as, for example, fins, heat pipes or passageways suitable for allowing the circulation of a cooling fluid.

To draw heat from the electric machine, the cooling device has to be in physical contact with, and at a lower temperature than, the electric machine. Prior to operating, the cooling device and the motor are at a common temperature. However, because they differ in temperatures when operating, the electric machine typically undergoes a thermal expansion different from a thermal expansion of the cooling device. This difference in thermal expansion may render the physical contact between the electric machine and the cooling device unsatisfactory.

To solve that problem, it is well known in the art to glue the cooling device to the electric machine with a heat-conducting adhesive. However, if the cooling device is inserted inside a cavity defined by the electric machine, the adhesive may not be strong enough to ensure that the physical contact is maintained. This may happen because the cooling device, as its temperature is lower, will typically expand less than the operating electric machine. Consequently, the cavity might become large enough to overwhelm the adhesive capacity of the adhesive.

Against this background, there exists a need in the industry to provide a novel cooling device for an electric machine.

OBJECTS OF THE INVENTION

An object of the present invention is therefore to provide an improved cooling device including a biasing element.

SUMMARY OF THE INVENTION

More specifically, in accordance with the present invention, there is provided a cooling device for an internal stator of an electric machine, the stator including a substantially cylindrical cavity defining a substantially cylindrical internal surface, the cooling device comprising:

a body defining an external substantially cylindrical contact surface; and a biasing element connected to the body; wherein the biasing element is so configured and sized as to bias the contact surface of the body against the internal surface of the rotor when the cooling device is positioned inside the cavity.

According to another aspect of the present invention, there is provided an electric machine comprising a cooling device for an internal stator of an electric machine, the stator including a substantially cylindrical cavity defining a substantially cylindrical internal surface, the cooling device including:

a body defining an external substantially cylindrical contact surface; and a biasing element connected to the body; wherein the biasing element is so configured and sized as to bias the contact surface of the body against the internal surface of the rotor when the cooling device is positioned inside the cavity.

According to another aspect of the present invention, there is provided a cooling device for an internal stator of an electric machine, the stator including a substantially cylindrical cavity defining a substantially cylindrical internal surface, the cooling device comprising:

a body defining an external substantially cylindrical contact surface; and biasing means connected to the body, the biasing means being so configured and sized as to bias the contact surface of the body against the internal surface of the rotor when the cooling device is positioned inside the cavity.

According to yet another aspect of the present invention, there is provided a cooling device for an internal stator of an electric machine, the stator including a cavity defining an internal surface, the cooling device comprising:

a body defining an external contact surface; and a biasing element connected to the body; wherein the biasing element and the body are so configured and sized as to bias the contact surface of the body against the internal surface of the rotor when the cooling device is positioned inside the cavity.

Other objects, advantages and features of the present invention will become more apparent upon reading of the following non-restrictive description of preferred embodiments thereof, given by way of example only with reference to the accompanying drawings.

DETAILED DESCRIPTION

In a nutshell, embodiments of the present invention provide an efficient means for mounting a cooling device inside a stator of an electric machine. The electric machine may be of the internal stator—external rotor type. The general principle is to provide a biasing element, integral or external with the cooling body that will ensure an adequate contact between the cooling body and the internal surface of the stator.

Figure 1:
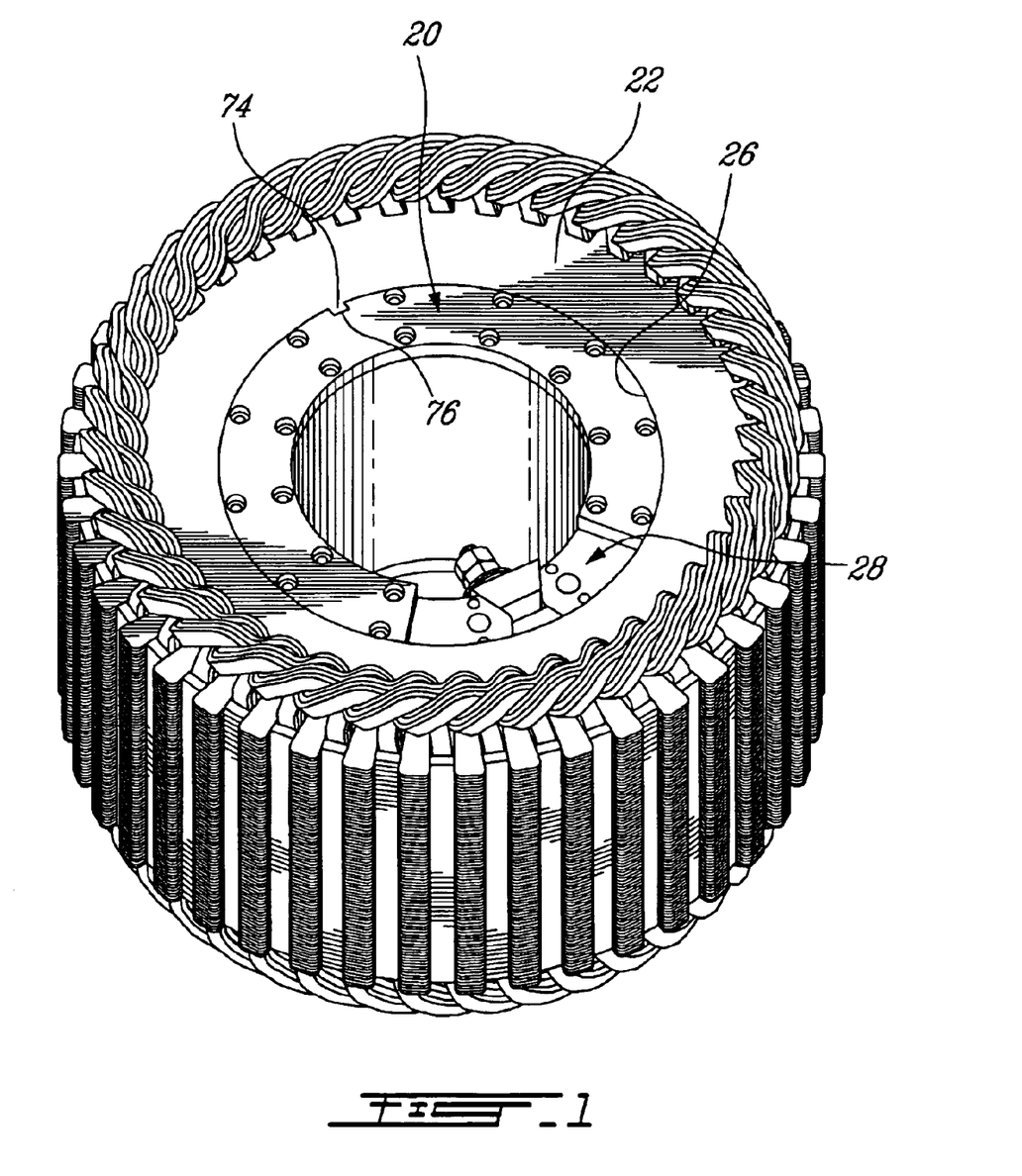
FIG. 1 is a perspective view of an embodiment of a cooling device according to an embodiment of the present invention positioned in a cavity of a stator of an electric machine.

FIG. 1 shows a cooling device 20 mounted in an internal stator 22 of an electric machine. As shown on FIG. 6, the stator 22 includes a cylindrical cavity 24 having a cylindrical internal surface 26.

Figure 2:
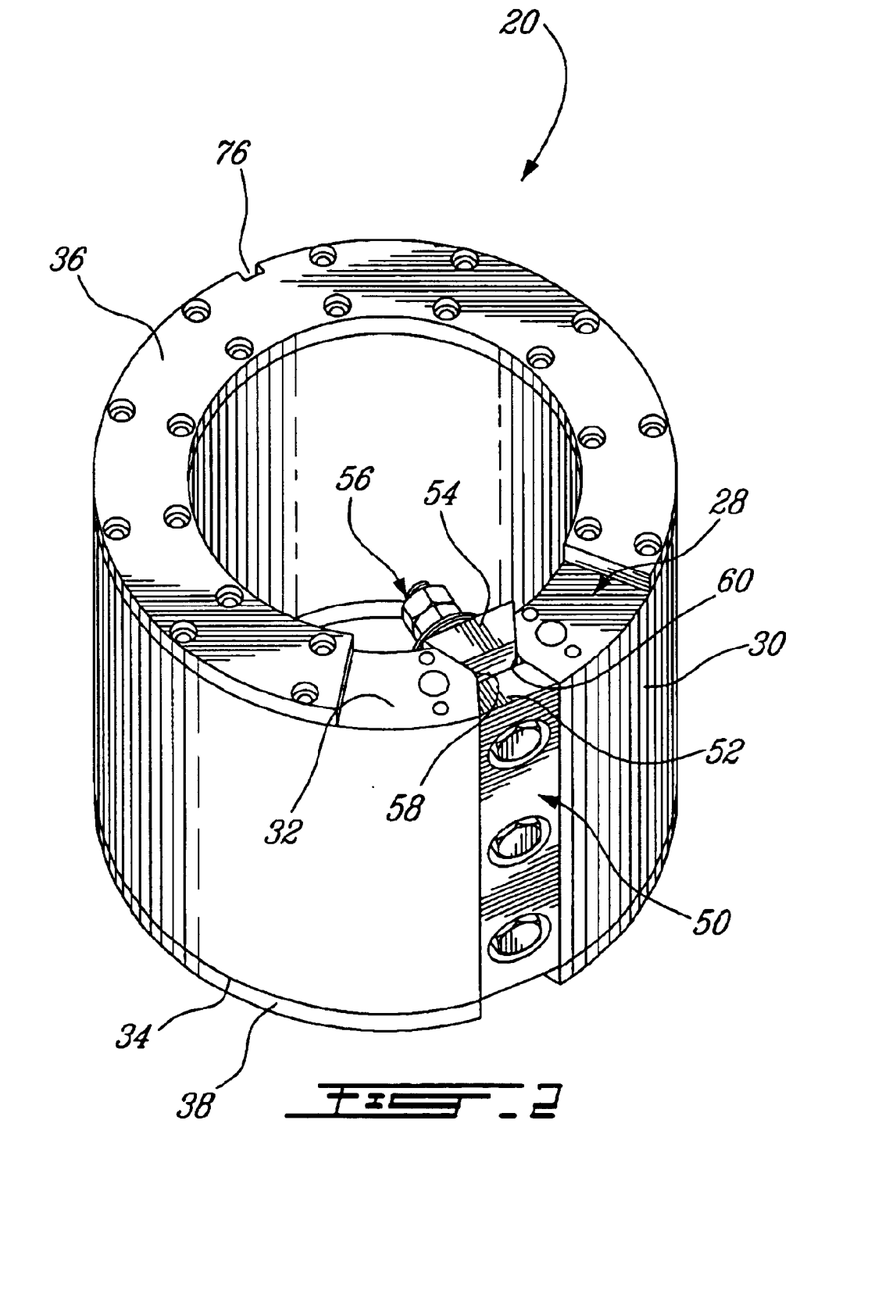
FIG. 2 is a perspective view of the cooling device of FIG. 1.

As can be better seen from FIG. 2, the cooling device 20 includes a body 28 defining an external cylindrical contact surface 30, a top surface 32 and a bottom surface 34. A top cover 36 and a bottom cover 38 are removably mounted to the top and bottom surfaces, respectively. The covers 36 and 38 are used to close a cooling passageway provided in the body 28.

More specifically, the cooling passageway 40 includes an inlet 42 for accepting the cooling fluid and an outlet 44 for releasing the cooling fluid. The cooling fluid takes heat away from the body 28, thereby allowing the body 28 to maintain a temperature lower than a temperature of the stator 22. Apparatuses and methods for causing a circulation of a cooling fluid in the cooling passageway and means for disposing of the heat taken away by the cooling fluid are well known in the art and will therefore not be discussed in further details.

Figure 3:
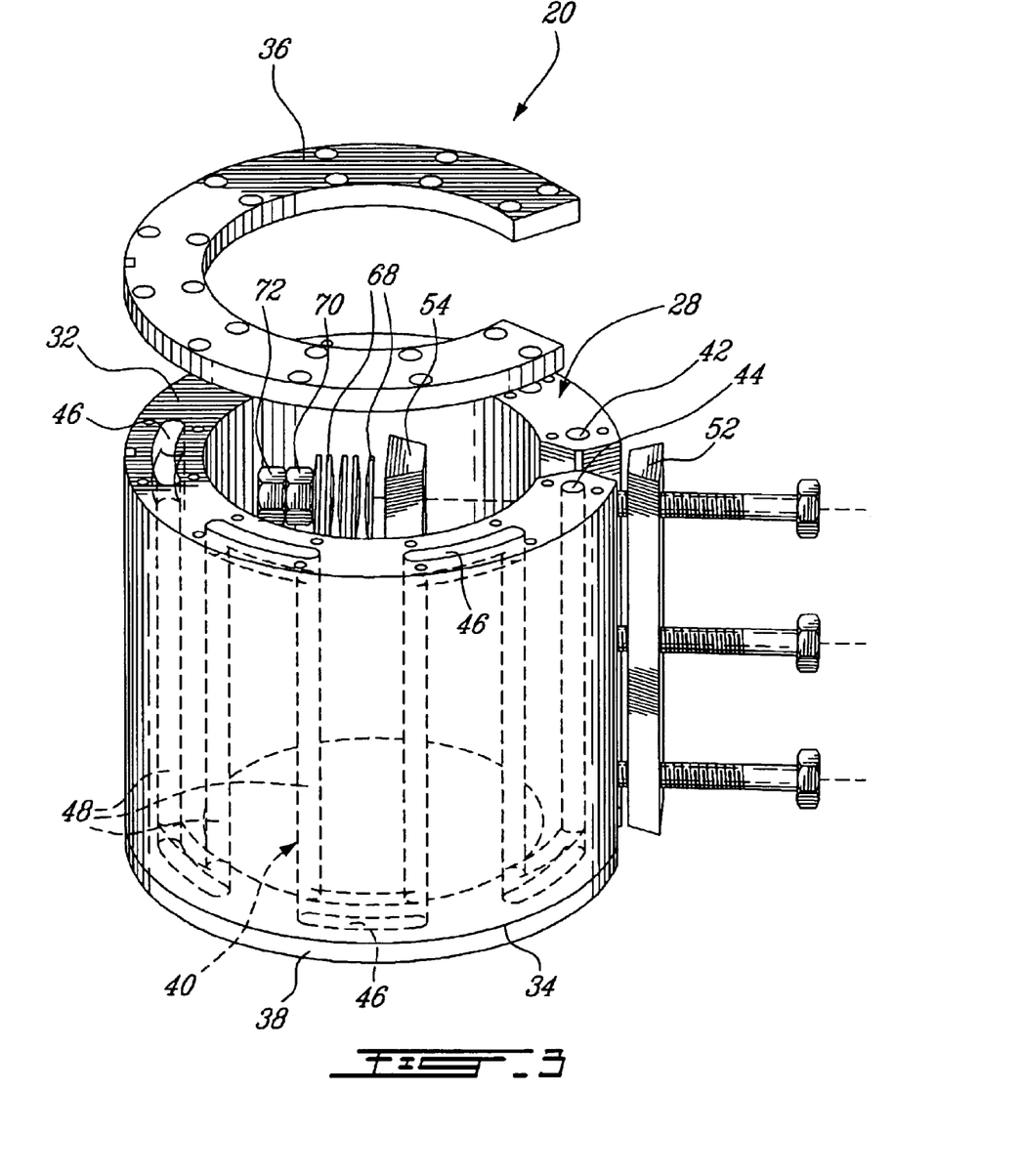
FIG. 3 is a perspective exploded view of the cooling device of FIG. 1.
Figure 4:
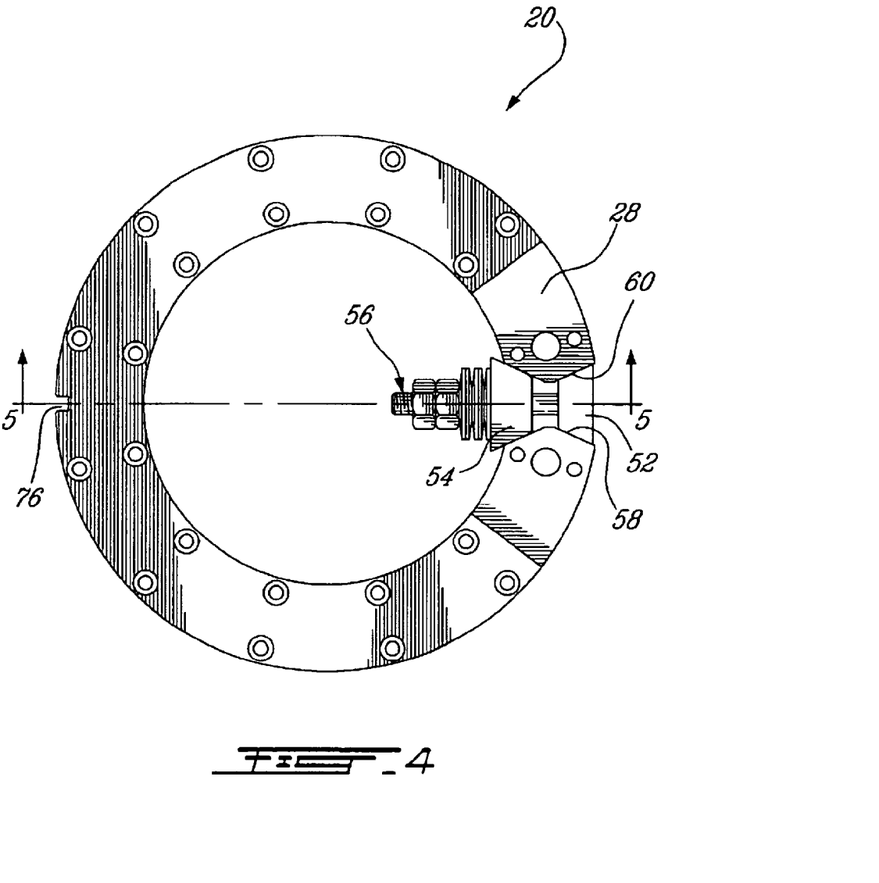
FIG. 4 is a top plan view of the cooling device of FIG. 1.

The cooling passageway includes a plurality of indentations 46 in each of the top and bottom surfaces 32 and 34 and a plurality of cooling conduits 48 extending generally axially through the body 28. The cooling conduits 48 are in a fluid communication relationship with the indentations 46. Each of the top and bottom covers 36 and 38 is generally shaped as the top and bottom surfaces 32 and 34 of the body 28 and close the indentations 46 to produce, in conjunction with the cooling conduits 48, a closed passageway for accepting the cooling fluid. Methods and apparatuses for connecting the top and bottom covers 36 and 38 to the body 28 are believed well known in the art and will therefore not be detailed herein.

Returning to FIG. 2, the cooling device 20 also includes a biasing assembly 50 that is so configured and sized as to bias the contact surface 30 of the body 28 against the internal surface 26 of the stator 22 when the cooling device 20 is positioned inside the cavity 24.

The biasing assembly 50 includes first and second wedging devices 52 and 54 maintained together by fastening assemblies 56. The biasing assembly 50 is to be mounted to the body 28 via opposed surfaces 58 and 60 of the body 28 as will be described hereinbelow. These opposed surfaces are defined by the generally C-shape of the body 28.

In the specific example illustrated in FIGS. 1 to 5, the first and second opposed surfaces 58 and 60 are convex. More specifically, each of the first and second surfaces 58 and 60 present a substantially trapezoidal cross-section, as can be better seen from FIG. 4. In addition, the first and second wedging devices 52 and 54 each have a trapezoidal cross-section and have a longitudinal dimension substantially equal to a longitudinal dimension of the body 28.

The number of fastening assemblies 56 is not critical to the invention. Each fastening assembly 56 includes a deformable and biasing portion that transmits a reaction force to the first and second wedging devices 52 and 54 as will be described hereinbelow.

Figure 5:
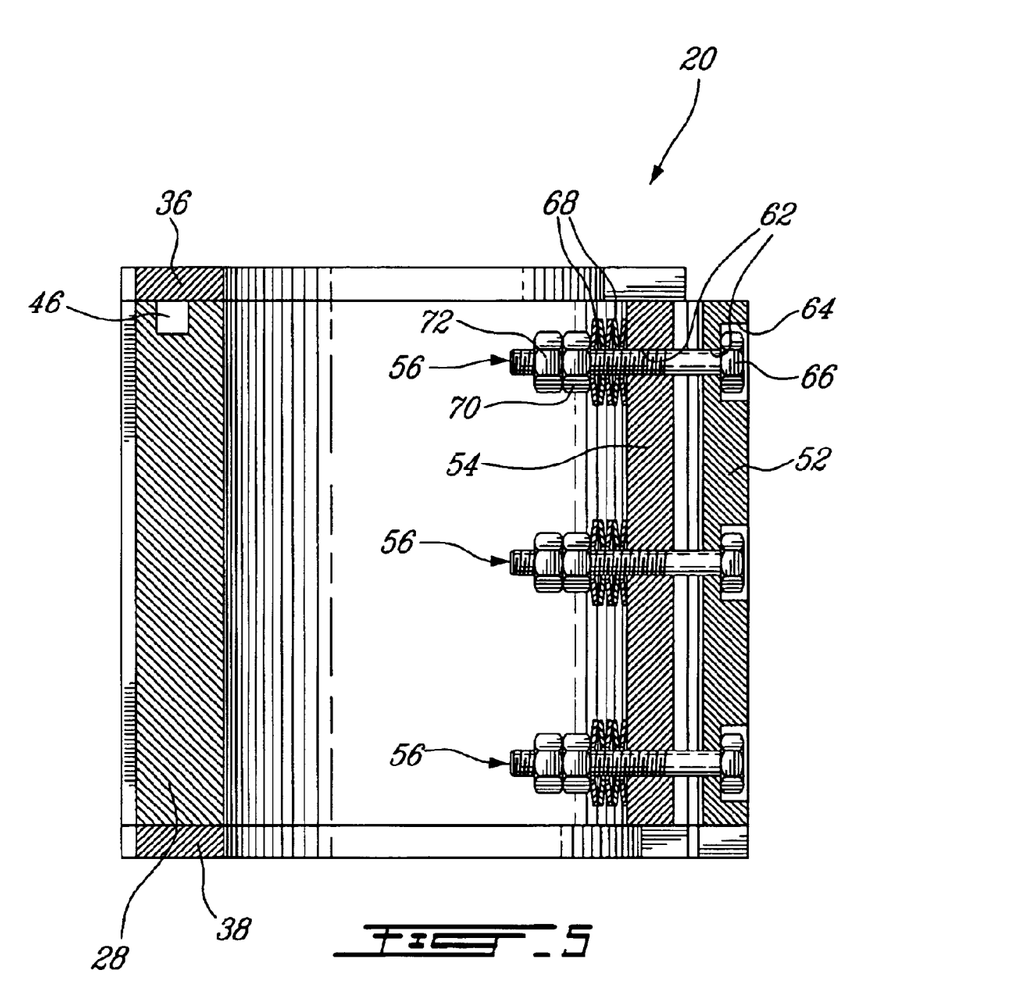
FIG. 5 is a side cross-sectional view taken along line 5—5 of FIG. 4.

As shown more clearly on FIG. 5, each of the first and second wedging devices 52 and 54 includes fastening apertures 62 to accept a part of the fastening assembly. Furthermore, the wedging device 52 includes shoulder portions 64 to accept the head of a fastener.

Each fastening assembly 56 includes a bolt 66 inserted through the shoulder portion 64 and the matched fastening apertures 62 of the first and second wedging devices 52 and 54. A deformable portion in the form of a disc springs 68 is inserted onto each bolt 66 between the second wedging device 54 and a respective first nut 70. The disc springs 630 include, for example, one or more Belleville spring washers mounted in series. However, many other types of disc springs could be used. In addition, a second nut 72 is threaded onto each bolt 66 to positively lock the nuts onto the bolt.

To mount the cooling device 20 in the stator 22, the cooling device 20 without the biasing assembly 50, or with the biasing assembly 50 in an non-biasing position, is inserted inside the cavity 24 of the stator 22. The nuts 70 of the fastening assemblies 56 are then tightened until a good contact exists between the external surface 30 of the body 28 and the internal surface 26 of the stator 22. Indeed, by tightening the fastener assemblies 56, the wedging devices 52 and 54 are pulled towards one another. The corresponding trapezoidal shape of the wedging devices 51 and 54 and of the first and second opposed surfaces 58 and 60 force the opposed surfaces 58 and 60 apart from one another, thereby forcing the external surface 30 onto the internal surface 26.

Via this good contact between the external surface 30 and the internal surface 26, the cooling device 20 draws heat away from the stator 22. Specifically, whenever a temperature of the electric machine is higher than a temperature of the body 28, heat flows away from the stator 22 through the internal surface 26 of the cavity 24 to enter the body 28 through the contact surface 30.

Figure 6:
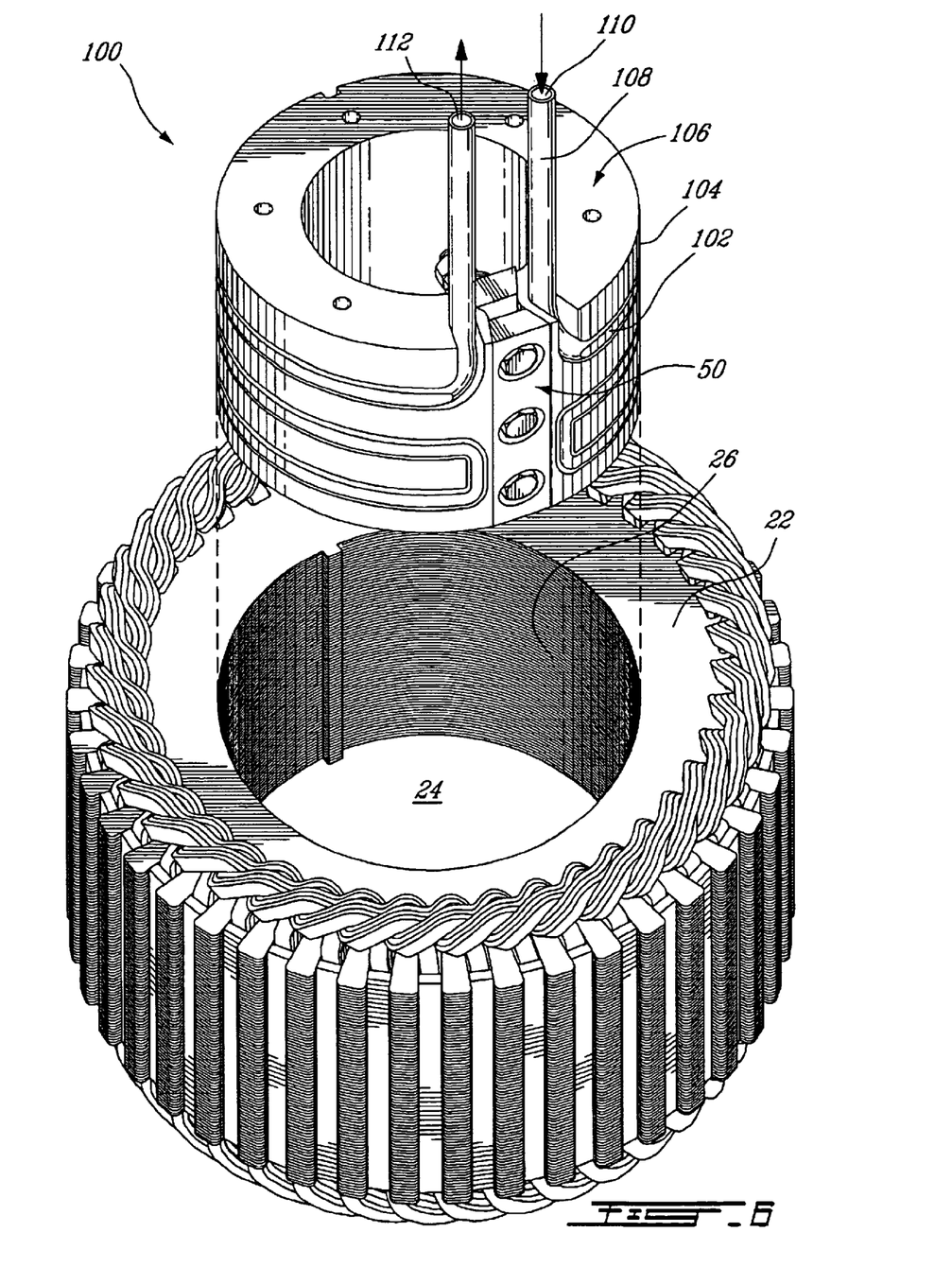
FIG. 6 is a perspective view illustrating an insertion of a cooling device according to a second embodiment of the present invention into a cavity of a stator of an electric machine.

To maintain the position between the cooling device 20 and the stator 22, the stator 22 optionally includes a key 74 extending from the internal surface 26, and the body 28 includes a keyway 76 in the contact surface 30. The keyway 76 is configured and sized to engage the key 74, thereby preventing a rotational motion of the cooling device 20 inside the stator 22.

The reader skilled in the art will readily appreciate that the cylindrical shape of the cavity 26 and of the body 28, which produce a circular cross-section, is not essential. For example, the body and the cavity could assume various cross-sections, such as an ovoid, an ellipse or a polygon, among others (not illustrated in the drawings). In fact, the body and the cavity can assume any suitable shape as long as they allow the biasing assembly to bias the contact surface of the body against the internal surface of the stator when the cooling device is positioned inside the cavity.

Turning now to FIG. 6 of the appended drawings, an alternate embodiment of a cooling device 100 will briefly be described. For concision purposes, only the differences between the cooling device 20 and the cooling device 100 will be described hereinbelow.

The main difference concerns cooling passageway that includes an indentation 102 in the contact surface 104 of the body 106. The indentation is configured to receive a cooling tube 108 having an inlet 110 and an outlet 112. The cooling fluid may circulate in the cooling tube 108. In addition, the indentation 102 assumes a generally horizontally oriented serpentine geometric configuration and is in direct contact with the internal surface 26 of the stator 22. However, the reader skilled in the art will readily appreciate that many other suitable geometric configuration are possible without detracting from the claimed invention.

It is to be noted that the biasing assembly 50 is identical to the biasing assembly of FIGS. 1 to 5.

In a second example of implementation of the present invention, the biasing element includes an expansion spring positioned between and connected to the first and second opposed surfaces. As shown on FIGS. 7 to 10, the expansion spring can take many forms.

Figure 7:
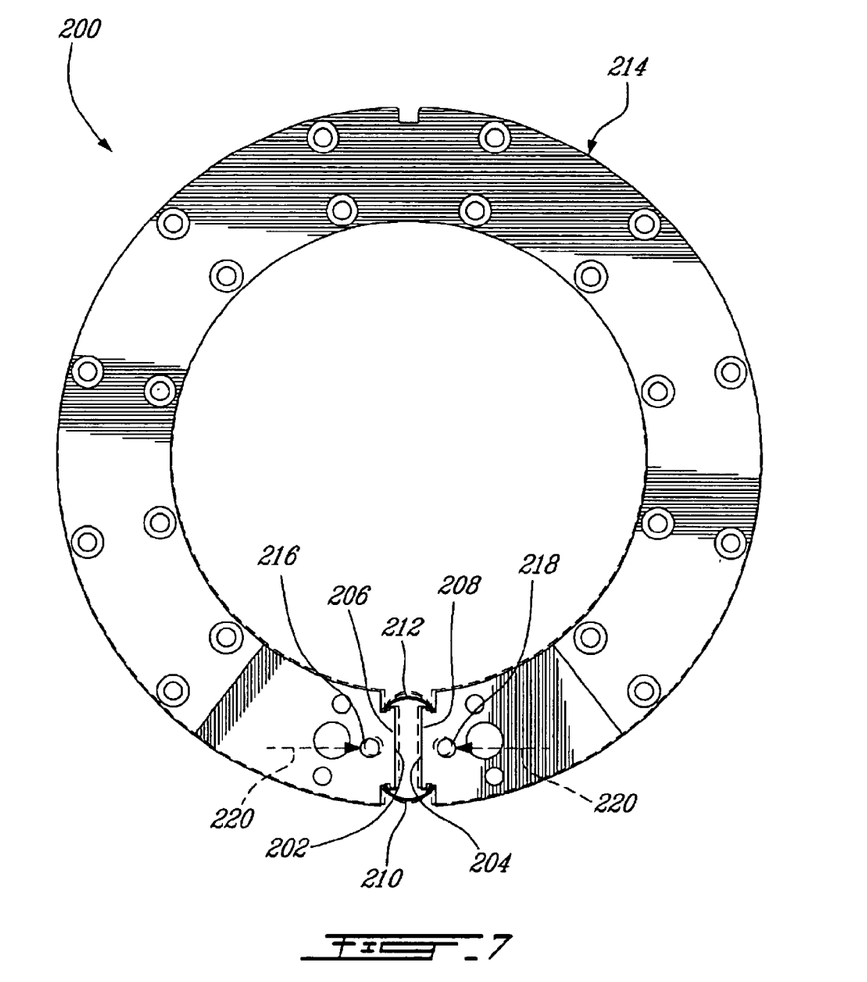
FIG. 7 is a top plan view of a third embodiment of a cooling device for a stator of an electric machine.

In the embodiment shown in top view on FIG. 7, a cooling device 200 has first and second opposed surfaces 202 and 204 each including a respective generally T-shaped protrusion 206 and 208. The generally T-shaped protrusions are so configured and shaped as to retain an expansion spring in the form of two generally cylindrical leaf-springs 210 and 212 by each enclosing a side of one of the generally cylindrical leaf-springs. Each generally cylindrical leaf-spring 210 and 212 extends from the top surface of the body 214 to the bottom surface of the body.

The body 214 also includes apertures 216 and 218 provided near each of the opposed faces 202 and 204. The apertures 216 and 218 are used to compress the body 214 (see dashed lines) to allow the insertion of the body inside the stator (not shown). More specifically, pins (not shown) are inserted in the apertures 216 and 218 and are moved towards one another (see arrows 220) to compress the springs 210 and 212 to thereby overcome the biasing action of the springs and allow the deformation of the body for its insertion in the stator. When the body is inserted in the stator, the pressure on the pins may be relaxed that the biasing action of the springs force the contact between the contact surfaces.

Figure 8:
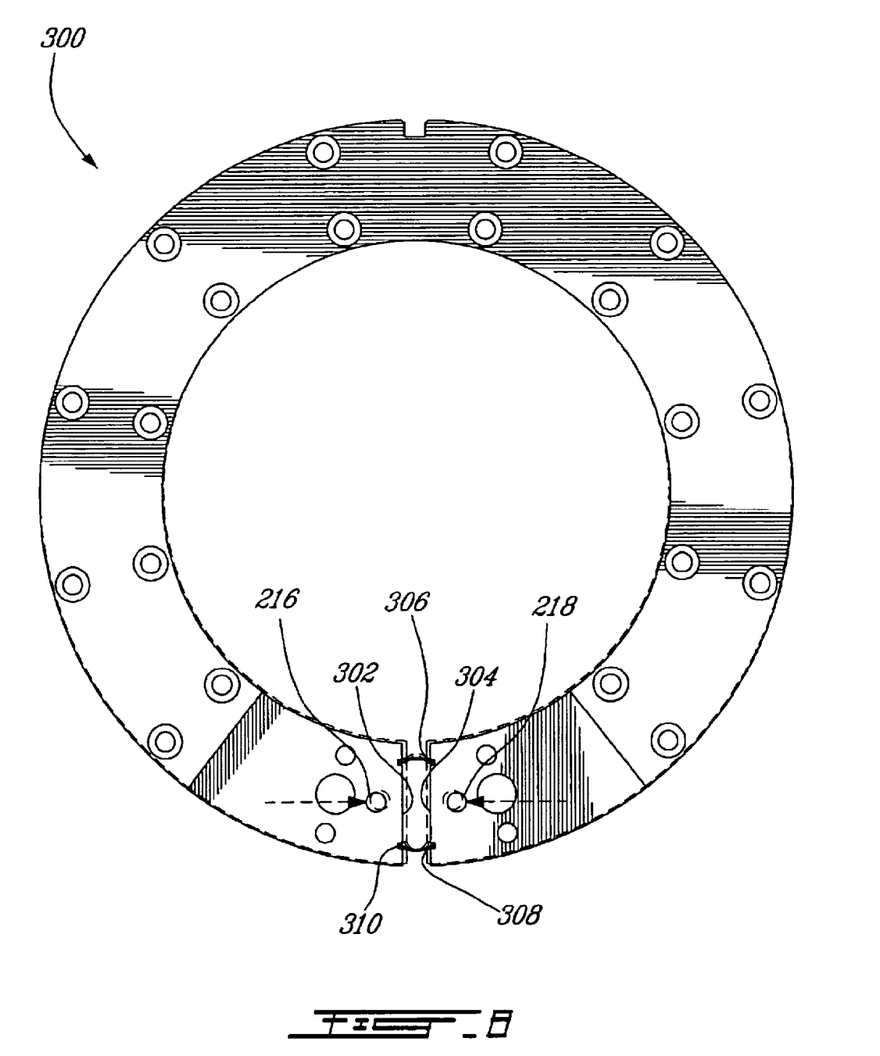
FIG. 8 is a top plan view of a fourth embodiment of a cooling device for a stator of an electric machine.

Turning now to FIG. 8, a cooling device 300 includes generally flat opposed surfaces 302 and 304 and two leaf-springs 306 and 308 are maintained in notches 310 extending longitudinally on the opposed surfaces 302 and 304. The generally cylindrical leaf-springs 302 and 304 are similar in shape and function to the leaf-springs 210 and 202 shown on FIG. 7.

Again, apertures 216 and 218 are provided to compress the leaf-springs 302 and 304.

Of course, any number of leaf-springs could be used without detracting from the present invention.

Figure 9:
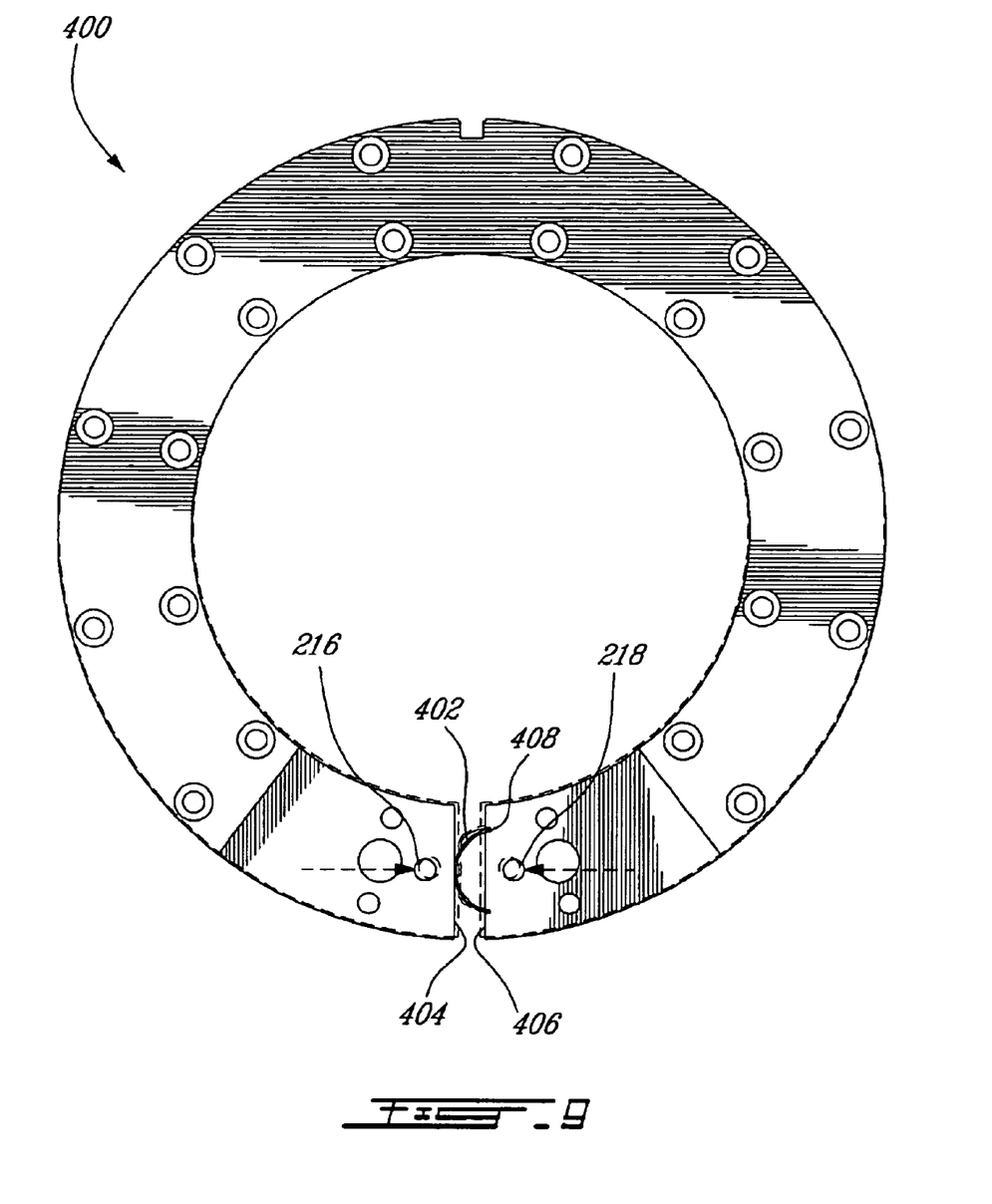
FIG. 9 is a top plan view of a fifth embodiment of a cooling device for a stator of an electric machine.

In a further alternative embodiment shown on FIG. 9, a cooling device 400 includes one leaf-spring 402 that is retained between the two opposed surfaces 404 and 406 by two notches 408 extending longitudinally on the second opposed surface 406. While not an essential requirement, the first opposed surface 404 can be flat, as illustrated. Once again, the leaf-spring 402 is similar in shape and function to the leaf-springs 202 and 212.

Figure 10:
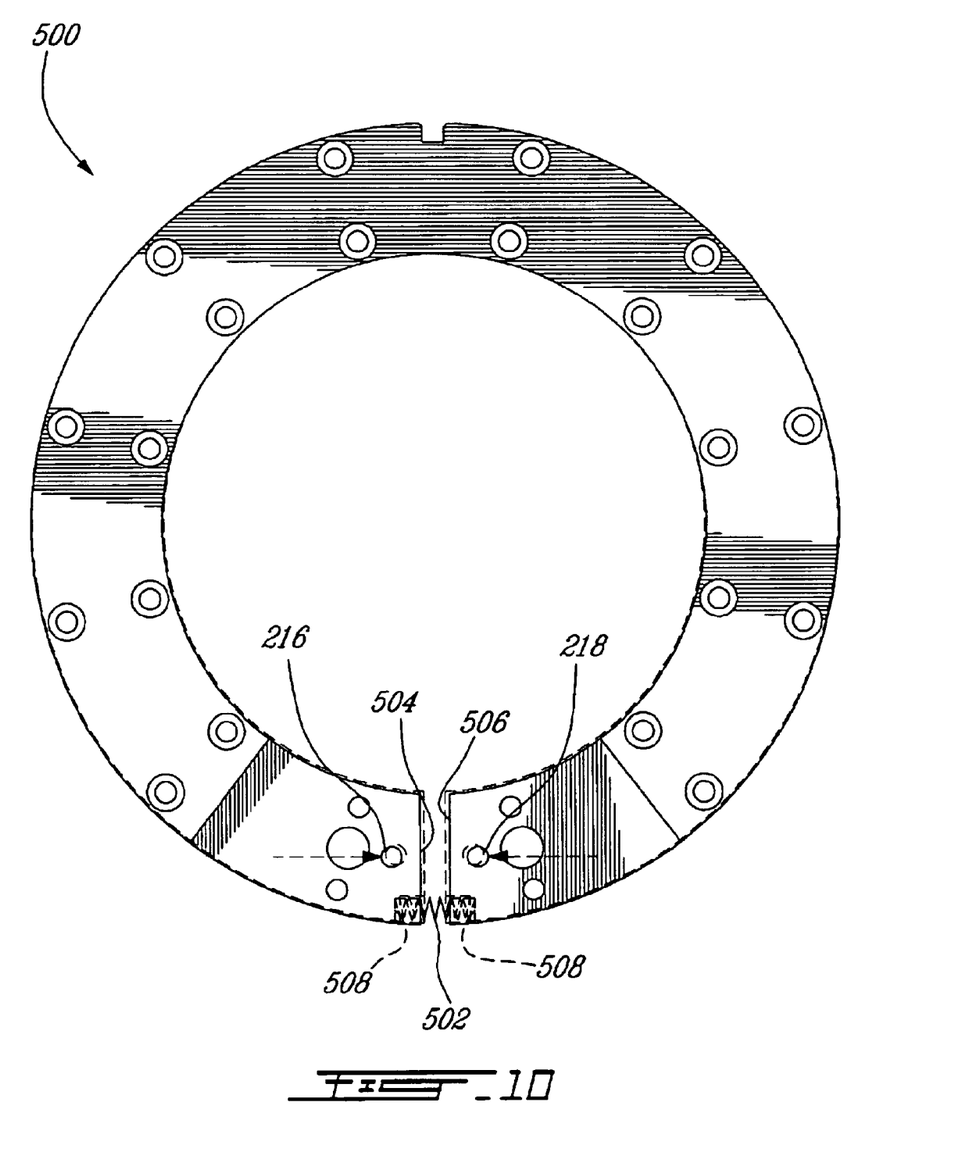
FIG. 10 is a top plan view of yet a sisth embodiment of a cooling device for a stator of an electric machine.

In yet a further alternative embodiment shown on FIG. 10, a cooling device 500 includes one or more coil springs 502 are inserted between the first and second opposed surfaces 504 and 506 within two shoulders 508. Each shoulder 508 is located on one of the first and second opposed surfaces 504 and 506 and receives one end of one of the coil springs 502.

Figure 11:
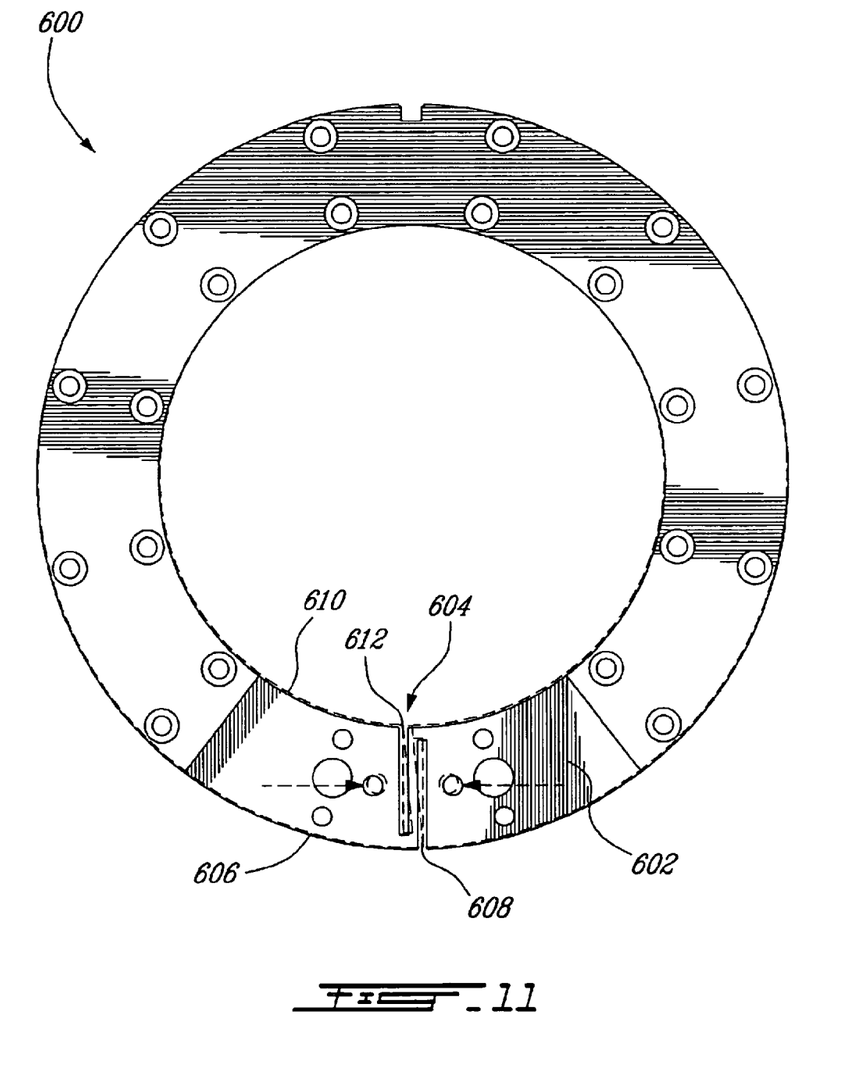
FIG. 11 is a top plan view of a seventh embodiment of a cooling device for a stator of an electric machine.

In a further variant illustrated on FIG. 11, a cooling device 600 includes a body 602 includes an integral spring 604.

The spring 604 is defined by a first longitudinal cut tangential to the external surface 606, the first cut defining a first channel 608 within the body 602. The spring 604 further includes a second longitudinal cut tangential to the internal surface 610, the second cut defining a second channel 612 within the body 602. The first and second channels 608 and 612 allow an elastic deformation of the spring 604 as can be seen in dashed lines in FIG. 11. It is believed that one skilled in the art will be in a position to determine the dimension and number of the cuts that should be made to the body 602 to enable a sufficient elastic deformation of the body 602 for its insertion into the stator.

Of course, one skilled in the art will understand that more than one integral spring such as 604 could be used.

Figure 12:
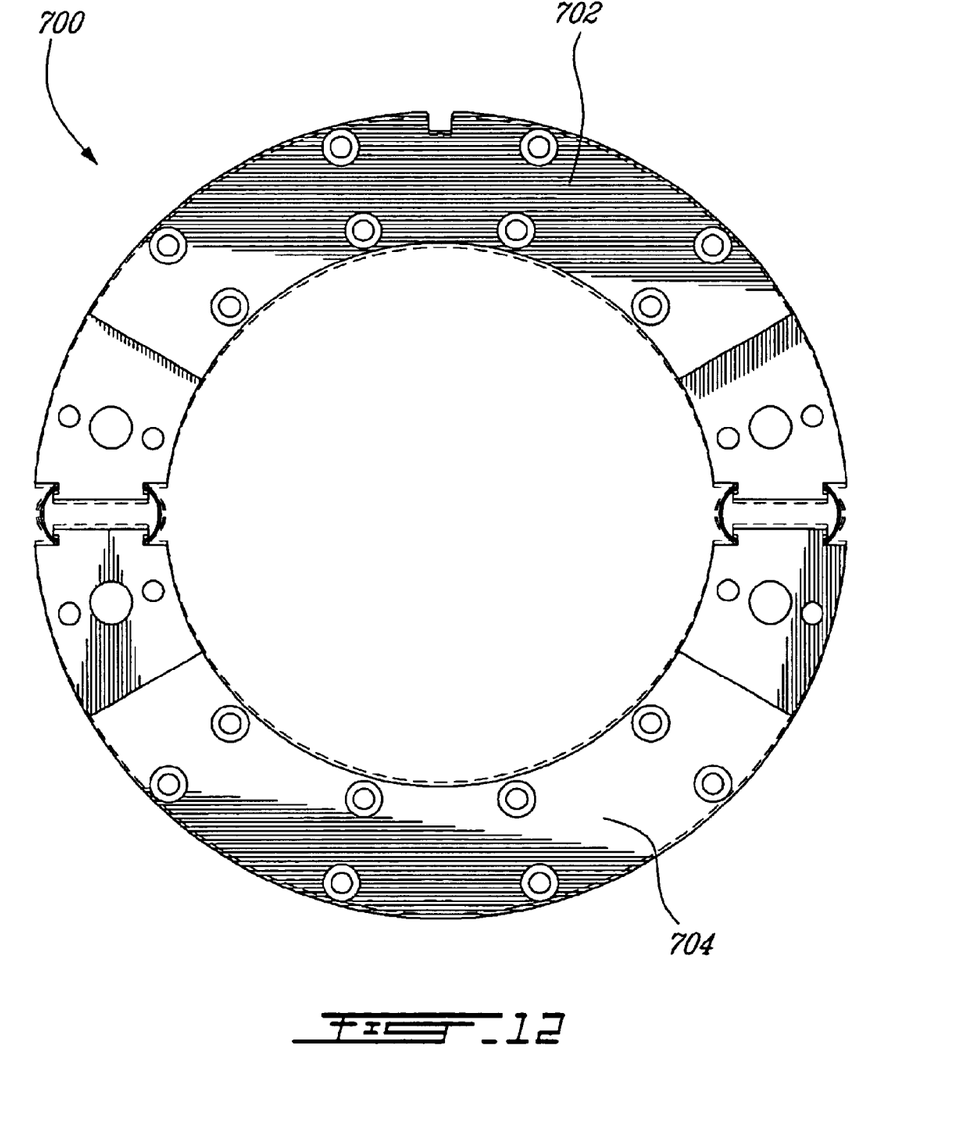
FIG. 12 is a top plan view of an eight embodiment of a cooling device for a stator of an electric machine.

A cooling device 700 according to an eight embodiment of the present invention is illustrated in FIG. 12. The cooling device 700 includes two identical body elements 702 and 704 together defining a generally circular cross-section body. The interconnection between the body elements 702 and 704 is identical to the interconnection between the facing ends 202 and 204 of the cooling device 200 of FIG. 7 and will therefore not be described further for concision purposes.

It is to be noted that the biasing means used to force the external surface of the body elements 702 and 704 towards the internal contact surface of the stator could be different, for example as illustrated in the other embodiments herein.

Having two body elements 702 and 704 may be interesting in some situations since it is not required to exert a compressive force to insert the body elements into the stator since the elements may be inserted one at a time and the biasing elements can be mounted thereto once the elements are in the stator.

In a specific example of implementation, the components of the cooling device are metallic. While not essential to the invention, the use of metals provide suitable strength and heat conduction capability to the cooling device. For example, aluminum has been used successfully. Alternatively, some of the elements, such as the covers 36 and 38 could be made of other materials, such as composite material, if weight is an issue for a particular application.

In the embodiments and variants presented herein above, and non-limitatively, the cooling device is inserted into the cavity as follows. First, an external compressive force is exerted on the body. The external force deforms the body and is transmitted to a spring included in the cooling device, thereby causing the spring to deform. In the drawings, the deformation of the body under the external force is illustrated by dashed contours slightly offset from the solid lines representing the body. Further to an insertion of the cooling device into the cavity, the external force is removed. Then, the spring causes an expansion force to be applied on the body, thereby biasing the contact surface of the body against the internal surface of the stator.

It is to be noted that while the embodiments of the cooling devices shown herein all use tubes carrying a cooling fluid to remove excess heat from the body of the cooling device, other excess heat removal devices such as fins and/or heat pipes could be used. These elements are believed well known in the art and will not be discussed in details herein.

Although the present invention has been described hereinabove by way of preferred embodiments thereof, it can be modified, without departing from the spirit and nature of the subject invention as defined in the appended claims.

What is claimed is:

1. A cooling device for an internal stator of an electric machine, the stator including a substantially cylindrical cavity defining a substantially cylindrical internal surface, said cooling device comprising:

a body defining an external substantially cylindrical contact surface; and a biasing element connected to said body; said biasing element including a spring integral with said body wherein said biasing element is so configured and sized as to bias said contact surface of said body against the internal surface of the stator when said cooling device is positioned inside the cavity.

2. A cooling device as defined in claim 1, wherein said body includes a cooling passageway configured to receive a circulating cooling fluid, said cooling passageway including an inlet and an outlet.

3. A cooling device as defined in claim 2, wherein said cooling passageway includes a cooling conduit extending through said body.

4. A cooling device as defined in claim 2, wherein said cooling passageway includes an indentation in said contact surface, said indentation being configured and sized to receive a cooling tube.

5. A cooling device as defined in claim 2, wherein said cooling passageway is arranged in a generally serpentine geometric configuration between said inlet and said outlet.

6. A cooling device as defined in claim 1, wherein said spring integral with said body includes:
a first longitudinal cut tangential to said external surface, said first cut defining a first channel within said body; and
a second longitudinal cut tangential to said external surface, said second cut defining a second channel within said body;
wherein said first and second channels allow an elastic deformation of said spring integral with said body.

7. A cooling device as defined in claim 1, wherein:
the stator includes a key extending from the internal surface; and
said body includes a keyway configured to engage the key, thereby preventing a rotational motion of said cooling device in said cavity.

8. A cooling device for an internal stator of an electric machine, the stator including a substantially cylindrical cavity defining a substantially cylindrical internal surface, said cooling device comprising:
a body defining an external substantially cylindrical contact surface; said body is generally C-shaped and defines a gap, said gap being delimitated by first and second opposed surfaces; and
a biasing element connected to said body;
wherein said biasing element is so configured and sized as to bias said contact surface of said body against the internal surface of the stator when said cooling device is positioned inside the cavity.

9. A cooling device as defined in claim 8, wherein said biasing element is so configured and sized as to bias said contact surface of said body against the internal surface of the rotor when said cooling device is positioned inside the cavity by exerting an expansion force on said first and second opposed surfaces.

10. A cooling device as defined in claim 9, wherein said biasing element includes at least one expansion spring connected to and positioned between said first and second opposed surfaces.

11. A cooling device as defined in claim 10, wherein said at least one expansion spring includes a leaf-spring having first and second opposed ends each connected to one of the opposed surfaces.

12. A cooling device as defined in claim 11, wherein said first and second opposed surfaces each include a respective generally T-shaped protrusion, said generally T-shaped protrusions being so configured and sized as to retain said at least one leaf-spring by each enclosing one of said ends thereof.

13. A cooling device as defined in claim 11, wherein said first and second opposed surfaces each include at least one longitudinally extending notch, said at least one longitudinally extending notch being so configured and sized as to receive one end of said at least one leaf-spring.

14. A cooling device as defined in claim 11, wherein:
said first opposed surface includes two longitudinally extending notches, each said longitudinally extending notches being so configured and sized as to receive one end of a leaf-spring; and
said leaf-spring contacts said second opposed surface along a longitudinal line located substantially at midpoint between said first and second ends.

15. A cooling device as defined in claim 10, wherein:
said at least one expansion spring includes a coil spring having first and a second ends;
said first and second opposed surfaces each include a shoulder; each shoulder are configured and sized to receive one of said first and second ends of said coil spring.

16. A cooling device as defined in claim 9, wherein said first and second opposed surfaces are convex.

17. A cooling device as defined in claim 16, wherein said biasing element includes first and second wedging devices, said first and second wedging devices being at least in part located between said first and second opposed convex surfaces.

18. A cooling device as defined in claim 17, wherein each of said first and second convex surfaces have a substantially trapezoidal cross-section.

19. A cooling device as defined in claim 18, wherein each trapezoidal cross-section is defined by a flat surface and two angled surfaces; the flat surfaces of each trapezoidal cross-section facing each other.

20. A cooling device as defined in claim 19, wherein said first and second wedging devices each have a trapezoidal cross-section.

21. A cooling device as defined in claim 20, wherein each trapezoidal cross-section wedging device is defined by a flat surface and two angled surfaces; the flat surfaces of each wedging device facing each other.

22. A cooling device as defined in claim 21, wherein said biasing element includes a fastening assembly for removable fastening said first wedging device to said second wedging device.

23. A cooling device as defined in claim 22, wherein said fastening assembly includes a deformable and biasing portion, said deformable portion transmitting a reaction force to said first and second wedging devices.

24. A cooling device as defined in claim 23, wherein said fastening assembly further includes a bolt and a nut; said first and second wedging devices include respectively first and second fastening holes configured and sized to receive said bolt; said deformable portion being mounted between one of the wedging devices and said nut to thereby bias said first and second wedging devices towards one another.

25. A cooling device as defined in claim 24, wherein said deformable portion transmitting a reaction force to said first and second wedging devices includes a disc spring inserted onto said bolt between said first wedging device and said nut.

26. A cooling device as defined in claim 25, wherein said disc spring includes at least one Belleville spring washer.

27. A cooling device as defined in claim 22, wherein said fastening assembly includes a plurality of fasteners for attaching said first wedging device to said second wedging device.

28. A cooling device as defined in claim 8, wherein:
said generally C-shaped body includes first and second body elements; and
said biasing element interconnects said first and second body elements.

* * * * *